(12) United States Patent
Huber et al.

(10) Patent No.: US 11,820,512 B2
(45) Date of Patent: Nov. 21, 2023

(54) WING FOR AN AIRCRAFT

(71) Applicant: Airbus Operations GmbH, Hamburg (DE)

(72) Inventors: Alexander Huber, Hamburg (DE); Bernhard Schlipf, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 15 days.

(21) Appl. No.: 17/581,468

(22) Filed: Jan. 21, 2022

(65) Prior Publication Data

US 2022/0234721 A1 Jul. 28, 2022

(30) Foreign Application Priority Data

Jan. 22, 2021 (DE) .................. 10 2021 101 446.8

(51) Int. Cl.
*B64C 9/02* (2006.01)
*B64C 9/08* (2006.01)
*B64C 9/24* (2006.01)

(52) U.S. Cl.
CPC ................. *B64C 9/02* (2013.01); *B64C 9/08* (2013.01); *B64C 9/24* (2013.01)

(58) Field of Classification Search
CPC .... B64C 9/02; B64C 9/08; B64C 9/24; B64C 9/22; B64C 13/28; B64C 3/50; B64C 3/28
See application file for complete search history.

(56) References Cited

U.S. PATENT DOCUMENTS

| 4,470,569 A * | 9/1984 | Shaffer ................ B64C 9/22 244/214 |
| 4,753,402 A * | 6/1988 | Cole .................... B64C 9/24 244/210 |
| 5,839,699 A | 11/1998 | Bliesner |
| 2009/0127402 A1 | 5/2009 | Jaggard et al. |

(Continued)

FOREIGN PATENT DOCUMENTS

| EP | 2 318 269 | 5/2011 |
| EP | 3 299 278 | 3/2018 |

(Continued)

OTHER PUBLICATIONS

Extended European Search Report for Application No. EP 22152052. 1, seven pages, dated Jun. 9, 2022.

(Continued)

*Primary Examiner* — Tien Q Dinh
*Assistant Examiner* — Nevena Aleksic
(74) *Attorney, Agent, or Firm* — Nixon & Vanderhye P.C.

(57) ABSTRACT

A wing for an aircraft is disclosed including a main wing, a slat, and a connection assembly movable connecting the slat to the main wing. The connection assembly includes an elongate slat track, wherein the front end of the slat track is mounted to the slat, wherein the rear end and the intermediate portion of the slat track are mounted to the main wing by a roller bearing including a guide rail mounted to the main wing and a first roller unit mounted to the rear end of the slat track and engaging the guide rail. The roller bearing includes a second roller unit mounted to the main wing and engaging an engagement surface at the intermediate portion of the slat track.

15 Claims, 10 Drawing Sheets

(56) References Cited

U.S. PATENT DOCUMENTS

| | | | |
|---|---|---|---|
| 2016/0167766 A1* | 6/2016 | Brakes | B64C 9/00 244/99.2 |
| 2019/0148923 A1* | 5/2019 | King | H02G 1/081 254/134.3 R |
| 2020/0122819 A1 | 4/2020 | Schlipf et al. | |
| 2021/0163121 A1 | 6/2021 | Schlipf et al. | |

FOREIGN PATENT DOCUMENTS

| | | | |
|---|---|---|---|
| EP | 3 378 760 | 9/2018 | |
| EP | 3 395 679 | 10/2018 | |
| EP | 3878734 | 9/2021 | |
| WO | 2010/026410 | 3/2010 | |
| WO | 2018/197265 | 11/2018 | |
| WO | 2018/197649 | 11/2018 | |
| WO | WO-2018197649 A1 * | 11/2018 | B64C 13/28 |

OTHER PUBLICATIONS

Search Report for DE Application No. 10 2021 101 446.8 dated Aug. 25, 2021, 8 pages.

* cited by examiner

WING FOR AN AIRCRAFT

CROSS REFERENCE TO RELATED APPLICATION

This application claims priority to and incorporates by reference German Application Number DE 10 2021 101 446.8, filed Jan. 22, 2021.

BACKGROUND

1. Field of the Invention

The present invention relates to a wing for an aircraft, comprising a main wing, a slat, and a connection assembly movable connecting the slat to the main wing, such that the slat is movable between a retracted position and at least one extended position. Further aspects of the invention relate to an aircraft comprising such a wing and to a connection assembly as used in such a wing.

2. Description of Related Art

The connection assembly comprises an elongate slat track that extends along a track longitudinal axis between a front end and a rear end and has an intermediate portion between the front and rear ends. The front end of the slat track is fixedly mounted to the slat, e.g. by two spherical bearings, both arranged with an offset in a wing profile plane across a wing span direction. The rear end and the intermediate portion of the slat track are movably mounted to the main wing by a roller bearing such that the slat track is movable along the track longitudinal axis, i.e. along a predefined path, for example, a circular path.

The roller bearing comprises a guide rail fixedly mounted to the main wing and a first roller unit mounted to the rear end of the slat track and engaging the guide rail. The guide rail is formed, e.g. by a c-shape, such that its surfaces lie opposite the circumferential surface of the first roller unit, wherein the distance between an upper surface and a lower surface of the guide rail is larger than a diameter of the first roller unit, so that the first roller unit may engage only either the upper surface or the lower surface of the guide rail at the same time. I.e., the distance between upper and lower surfaces of the guide rail is selected such that a clearance is provided between the first roller unit and either the upper surface or the lower surface of the guide rail, so that the first roller unit cannot engage with the upper and lower surfaces of the guide rail at the same time and thereby block the first roller unit. Furthermore, the first roller unit has a first axis of rotation extending in parallel to a wing span direction, to a leading edge of main wing, or to a leading edge of the slat.

The roller bearing comprises a second roller unit that is fixedly mounted to the main wing and that engages an engagement surface provided at the intermediate portion of the slat track. The second roller unit may have a second axis of rotation extending in parallel to the wing span direction, to the leading edge of main wing, or to the leading edge of the slat.

Such wings are known in the art, for example from WO 2018/197649 A1, where a certain play between the first and second roller units and the corresponding contact surfaces at the guide rail and the slat track is provided to ensure operability of the slat track under wing deformation, loads, thermal extension and due to manufacturing tolerances.

SUMMARY

A wing is disclosed having reduced play during movement of the slat between retracted and extended positions.

The roller bearing may include a biasing roller unit. The biasing roller unit biases, in particular elastically urges, the first roller unit in contact with the guide rail to avoid or compensate play between the first roller unit and the guide rail. Additionally or alternatively, the biasing roller unit biases, in particular elastically urges, the second roller unit in contact with the engagement surface to avoid or compensate play between the second roller unit and the engagement surface. "Contact" in this connection may mean continuous contact during deployment of the slat, i.e. during movement of the slat track along the roller bearing between the retracted and extended positions of the slat. The biasing roller unit might include a single roller element or might include two or more roller elements, for example, rotating about a biasing axis parallel to the first and second axes of rotation of the first and second roller units.

By such a play reduction, precision of the slat setting positions, i.e. the retracted position and the at least one extended position, is increased. Further, the play reduction reduces wear on the slat track, on the guide rail, and on the first and second roller units. Also, undesired vibration is avoided. By the biasing roller being biased and thus urging in an elastic manner the first roller unit in contact with the guide rail and/or the second roller unit in contact with the engagement surface, it is provided that load peaks and high static loads are received mainly by the first and/or second roller units, while the biasing roller merely serves for creating contact and reducing play during deployment of the slat, but not for receiving essential aerodynamic loads during flight.

According to an exemplary embodiment, the slat track has a profile, i.e. a cross section across the longitudinal axis, comprising an upper flange portion, a lower flange portion and at least one web portion connecting upper and lower flange portions. Such a profile might be e.g. a C-profile, a double-C-profile, an I-profile, an H-profile, or a Π-profile. The second roller unit is arranged in a recess between upper and lower flange portions and engages the engagement surface provided at the upper flange portion and/or at the lower flange portion, for example, either the upper flange portion or the lower flange portion or both flange portions in a successive manner. In such a way, the second roller unit does not occupy the space above and below the slat track, and the slat track can be held with only a single roller element. This simplifies the connection assembly, saves space and weight, and thus increases efficiency of the wing. Further, the connection assembly can be formed such that it is arranged entirely in front of the front spar of the associated wing and does not penetrate the front spar.

In particular, the slat track may have such a profile, in particular an I-profile or double-C-profile, that a first recess is formed between the upper and lower flange portions at a first side of the web portion, and a second recess is formed between the upper and lower flange portions at a second side of the web portion opposite the first side. In such a way, two roller elements can be received in both recesses.

The second roller unit may comprise a first roller element and a second roller element. The first roller element is arranged in the first recess and the second roller element is arranged in the second recess. First and second roller elements are arranged coaxially, i.e. both rotate about the second axis of rotation, and have the same radius. By the first and second roller element higher loads can be absorbed and a symmetric arrangement or an arrangement with two separate load paths is enabled.

According to an exemplary embodiment, the biasing roller unit is mounted to the main wing using a biasing element biasing the biasing roller unit in engagement with the slat track. Additionally or alternatively, the biasing roller unit is mounted to the slat track using a biasing element biasing the biasing roller unit in engagement with the guide rail. The biasing element may include an elastic element, but might also include a pneumatic element, a hydraulic element, or an electric, element configured for causing a biasing force. Such biasing elements form a simple and efficient way to reduce play between the first roller unit and the guide rail as well as between the second roller unit and the engagement surface.

In particular, the biasing roller unit may be rotatably mounted to the main wing in such a way that it is rotatably, by its circumferential surface, biased in engagement with a surface of the slat track, to elastically urge the first roller unit in contact with the guide rail and/or the second roller unit in contact with the engagement surface. When the biasing roller unit is mounted to the main wing and engages the slat track, several different positions are possible which can all cause efficient play reduction.

In particular, the biasing roller unit, may centrally, at the intermediate portion, be biased in engagement with an upper surface of the slat track, or at an upper surface of the upper flange portion of the slat track, in such a way that the biasing roller unit elastically or resiliently urges the first roller unit in contact with an upper rail surface of a lower rail part of the guide rail, and/or the second roller unit in contact with the engagement surface provided at a lower surface of the upper flange portion. In such a way, a very efficient play reduction is enabled.

The guide rail may be formed in a way of a slot including the lower rail part with the upper rail surface and an upper rail part with a lower rail surface opposite from the upper rail surface. In such a way, the first roller unit can be guided from opposite sides, i.e. from above and below.

Alternatively, the guide rail may be formed in a one-sided way including only the lower rail part with the upper rail surface, but not including any upper rail part with a lower rail surface opposite from the upper rail surface. This means, by providing the biasing roller unit, the upper rail part can be saved, whereby weight and costs can be reduced.

According to an exemplary embodiment, the biasing roller is directly mounted to the main wing, e.g. to a leading edge rib of the main wing. According to an alternative embodiment, the biasing roller is mounted to the main wing via the guide rail, while the guide rail in turn is fixedly mounted to the main wing, e.g. to a leading edge rib of the main wing. The guide rail provides a suitable mounting surface, so mounting the biasing roller to the guide rail is a very efficient mounting.

According to an exemplary embodiment, the biasing roller unit is mounted to a pivot element, such as a bar, a link, or a lever, rotatably about the biasing axis. The pivot element is mounted to the main wing, directly or via the guide rail, pivotably about a pivot axis spaced apart from and may be in parallel to the biasing axis. The biasing element biases the pivot element about the pivot axis, so that the biasing roller unit mounted to the pivot element is biased in engagement with the slat track. By such a pivot element the biasing roller can be biased in engagement with the slat track in a simple and effective way, wherein the pivot element might e.g. be connected to the biasing element or might itself include the biasing element.

In particular, a backstop element may be provided, and may be mounted to the main wing or to the guide rail, for limiting deflection of the pivot element about the pivot axis. Such a backstop serves as a backup support for high static or load cases or failure.

According to an exemplary embodiment, the pivot element is formed as a rocker element holding the biasing roller unit at a first end and supported against or connected to the biasing element at the opposite second end, wherein the biasing element may be supported at the main wing or at the guide rail. Between the biasing roller unit and the biasing element, for example, at an intermediate portion between the first end and the second end, the pivot element is pivotably mounted to the main wing or to the guide rail, so that the biasing element biases the second end of the pivot element away from the slat track and thus biases the pivot element to pivot about the pivot axis thereby biasing the first end with the biasing roller into engagement with the slat track. Such a pivot element in the form of a rocker forms a very simple and effective biasing support for the biasing roller.

In particular, the biasing element may be formed as a spring element, may be a linear spring element, such as coil spring. A spring element relates to a very simple and reliable biasing element.

According to an exemplary embodiment, the pivot element is formed as an elastic lever mounted to the main wing pivotably about the pivot axis at a first end and supported at the main wing at an opposite second end. Between the first and second ends the biasing roller unit is mounted to the pivot element. The biasing element may be formed as the pivot element itself or is integrated in the pivot element, so that at least a part of the pivot element, for example, the part between the pivot axis and the second end, which may be the longer part, is formed of an elastic material. In such a way, a very simple and effective pivot element is formed. Also, this configuration allows for the upper rail part to be omitted.

In particular, the second end of the pivot element may be adjustably supported at the main wing by an adjustment device, e.g. a screw, an eccentric shaft or an eccentric sleeve, configured for adjusting the position, in particular the distance, of the second end of the pivot element relative to the slat track to adjust the biasing force of the biasing roller onto the slat track.

The adjustment device may include a screw that is arranged in a threaded bore at the main wing and contacts with its tip the second end of the pivot element, so that by rotating the screw in the bore the axial position of the tip of the screw can be adjusted thereby increasing or decreasing pressure of the tip on the second end of the pivot element.

The adjustment device may include an eccentric shaft mounted to the main wing rotatably about an adjustment axis and having an eccentric portion which is eccentric to the adjustment axis and which is in contact with the second end of the pivot element, so that by rotation of the eccentric shaft about the adjustment axis the eccentric portion rotates with its varying distance from the adjustment axis and increases or decreases pressure of the eccentric portion on the second end of the pivot element. In such a way, very simple and efficient adjustment mechanisms are provided.

A locking member may be provided for locking the eccentric shaft in a fixed angular position relative to the main wing, for example, relative to at least one leading edge rib, thereby locking the eccentric portion in a fixed position relative to the second end of the pivot element. The locking member might comprise e.g. a toothed lock bar engaging a toothed outer surface of the eccentric shaft. By such a locking member the position of the biasing roller relative to the slat track and thus the amount of biasing and related play reduction applied, can be precisely adjusted.

According to an exemplary embodiment, the biasing roller unit, may centrally, at the intermediate portion, be biased in engagement with a lower surface of the slat track, for example, a lower surface of the lower flange portion of the slat track, in such a way that the biasing roller unit urges the first roller unit in contact with a lower rail surface of an upper rail part of the guide rail, and/or the second roller unit in contact with the engagement surface provided at an upper surface of the lower flange portion. In such a way, a further very efficient play reduction is enabled.

Alternatively, the biasing roller unit may be biased in engagement with the engagement surface provided at a lower surface of the upper flange portion in such a way that the biasing roller unit urges the second roller unit in contact with the engagement surface provided at an upper surface of the lower flange portion. In such a way, a further very efficient play reduction is enabled.

According to an exemplary embodiment, the biasing roller unit is mounted rotatably to the slat track in such a way that it is rotatably, by its circumferential surface, biased in engagement with a surface of the guide rail, to elastically urge the first roller unit in contact with the guide rail and/or the second roller unit in contact with the engagement surface. In such a way, very efficient play reduction is enabled without the biasing roller unit needing to be mounted to the main wing.

In particular, the biasing roller unit may be biased in engagement with a lower rail surface of an upper rail part in such a way that the biasing roller unit urges the first roller unit in contact with an upper rail surface of a lower rail part opposite from the lower rail surface of the upper rail part. In such a way, a further very efficient play reduction is enabled.

According to an exemplary embodiment, the web portion of the slat track comprises a slot extending from the first side to the second side of the web portion and extending elongated along the track longitudinal axis. The slot may extend along the track longitudinal axis at least as long as the distance by which the slat is moved between the retracted and a fully extended position. The first roller element and the second roller element are mounted on one common shaft for common rotation. The common shaft proceeds through the slot from the first side to the second side of the web portion. The opposite ends of the common shaft may be supported at the main wing. By using one common shaft to support first and second roller elements bending loads introduced in the main wing structure are minimized.

According to an exemplary embodiment, the first roller element is mounted on a first shaft and the second roller element is mounted on a second shaft separate from the first shaft. The first and second shafts may be independently supported at the main wing. By using separate shafts to support first and second roller elements no slot through the slat track is required.

According to an exemplary embodiment, the first roller unit may comprise a single third roller element, for example, mounted to the slat track by a yoke-shaped rear end of the slat track that holds the third roller element from opposite sides. Using only a single third roller element represents a very simple design.

According to an exemplary embodiment, the first roller unit may comprise a third roller element and a fourth roller element. Third and fourth roller elements are arranged coaxially, i.e. both rotating about the first axis of rotation, and have the same radius. The third roller element may be arranged at the first side and the fourth roller element is arranged at the second side of the web portion. In such a way, a backup roller element is provided.

According to an exemplary embodiment, the slat track comprises a first track part and a second track part that are formed separate from one another. Each of the first and second track parts is formed integrally and extends along the track longitudinal axis from the rear end to the front end. The first and second track parts are mounted to one another, e.g. by bolts, and rest against one another along a contact plane spanned by the track longitudinal axis and a wing thickness direction, which might be a vertical symmetry plane, for example, along the entire longitudinal extension. By the first and second track part two separate load paths are introduced which might be designed as redundant load paths such that when one load path fails the other load path is still capable of carrying the occurring air loads applied via the slat.

In particular, the third roller element may be mounted to both the first track part and the second track part. In such a way, in case of failure of one of the first and second track parts the third roller element would still be sufficiently supported by the other one of the first and second track parts, so that this track part would still be guided by the third roller element.

Alternatively, the third roller element may mounted to the first track part and the fourth roller element is mounted to the second track part. In such a way, in case of failure of one of the first and second track portions the other one of the first and second track portions would still be guided by the associated one of the third and fourth rollers.

According to an exemplary embodiment, the connection assembly is a first connection assembly. The wing comprises a second connection assembly connecting the slat to the main wing in a position spaces apart from the first connection assembly in a wing span direction. The second connection assembly is formed as the first connection assembly, i.e. has the same features as the first connection assembly. Alternatively, the second connections assembly might also be formed different from the first connection assembly.

The invention embodies an aircraft comprising a wing according to any of the afore-described embodiments. The features and advantages mentioned in connection with the wing also apply for the aircraft.

The invention embodies a connection assembly for movably connecting a slat to a main wing for an aircraft, as described above in connection with the wing. The connection assembly comprises an elongate slat track that extends along a track longitudinal axis between a front end and a rear end and has an intermediate portion between the front and rear ends. The front end of the slat track is configured to be mounted to the slat. The rear end and the intermediate portion of the slat track are configured to be mounted to the main wing by a roller bearing such that the slat track is movable along the track longitudinal axis.

The roller bearing comprises a guide rail configured to be mounted to the main wing, and a first roller unit mounted to the rear end of the slat track and configured for engaging the guide rail. The roller bearing comprises a second roller unit that is configured to be mounted to the main wing and that is configured for engaging an engagement surface provided at the intermediate portion of the slat track. The roller bearing comprises a biasing roller unit configured for biasing, i.e. elastically urging, the first roller unit in contact with the guide rail and/or configured for biasing, i.e. elastically urging, the second roller unit in contact with the engagement surface. The features and advantages mentioned in connection with the wing also apply for the connection assembly that can be used in such a wing.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
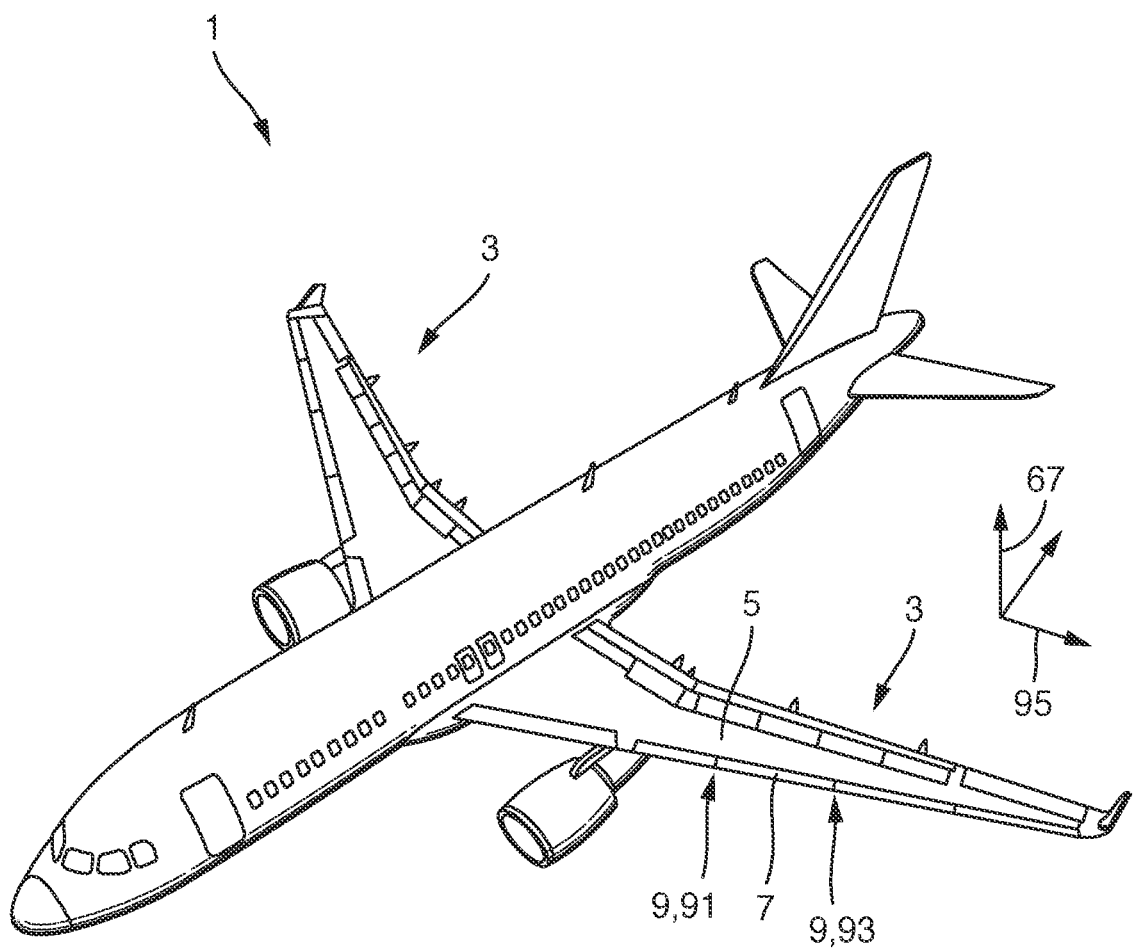
FIG. 1 is a perspective view of an aircraft according to the present invention, including a wing.

In FIG. 1 an aircraft 1 according to an embodiment of the present invention is illustrated. The aircraft 1 comprises a wing 3 that is formed according to an embodiment of the present invention.

Figure 2:
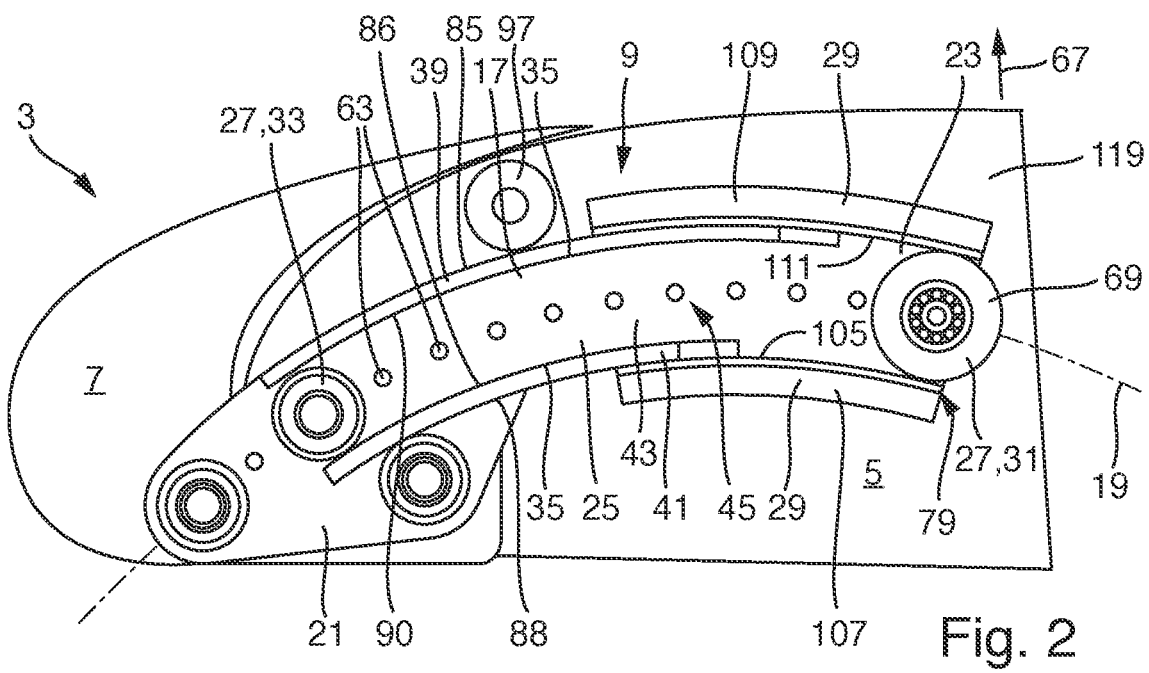
FIG. 2 is a cross sectional view of the wing shown in FIG. 1, including a connection assembly according to a first embodiment of the invention.

FIG. 2 shows the wing 3 from FIG. 1 in more detail. The wing 1 comprises a main wing 5, a slat 7, and a connection assembly 9 movable connecting the slat 7 to the main wing 5, such that the slat 7 is movable between a retracted position ii and at least one extended position 13, 15.

The connection assembly 9 comprises an elongate slat track 17 that extends along a track longitudinal axis 19 between a front end 21 and a rear end 23 and has an intermediate portion 25 between the front and rear ends 21, 23. The front end 21 of the slat track 17 is fixedly mounted to the slat 7. The rear end 23 and the intermediate portion 25 of the slat track 17 are movably mounted to the main wing 5 by a roller bearing 27 such that the slat track 17 is movable along the track longitudinal axis 19.

Figure 3:
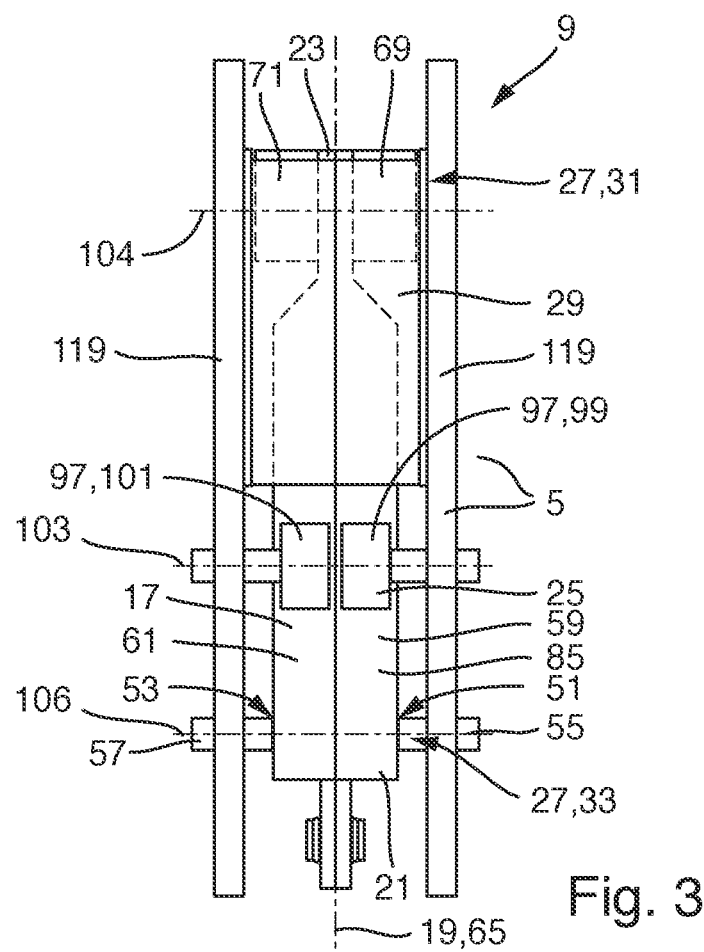
FIG. 3 is a top view of the connection assembly shown in FIG. 2.
Figure 4:
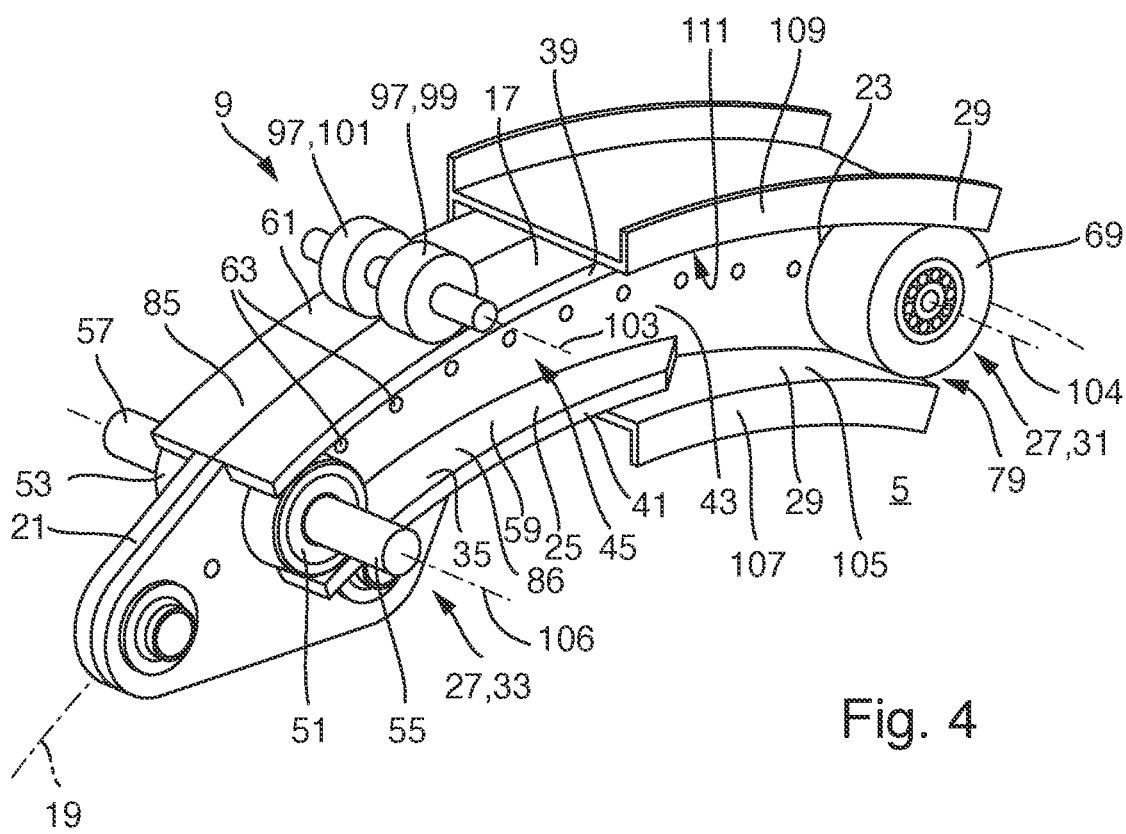
FIG. 4 is a perspective view of the connection assembly shown in FIG. 2.
Figure 5:
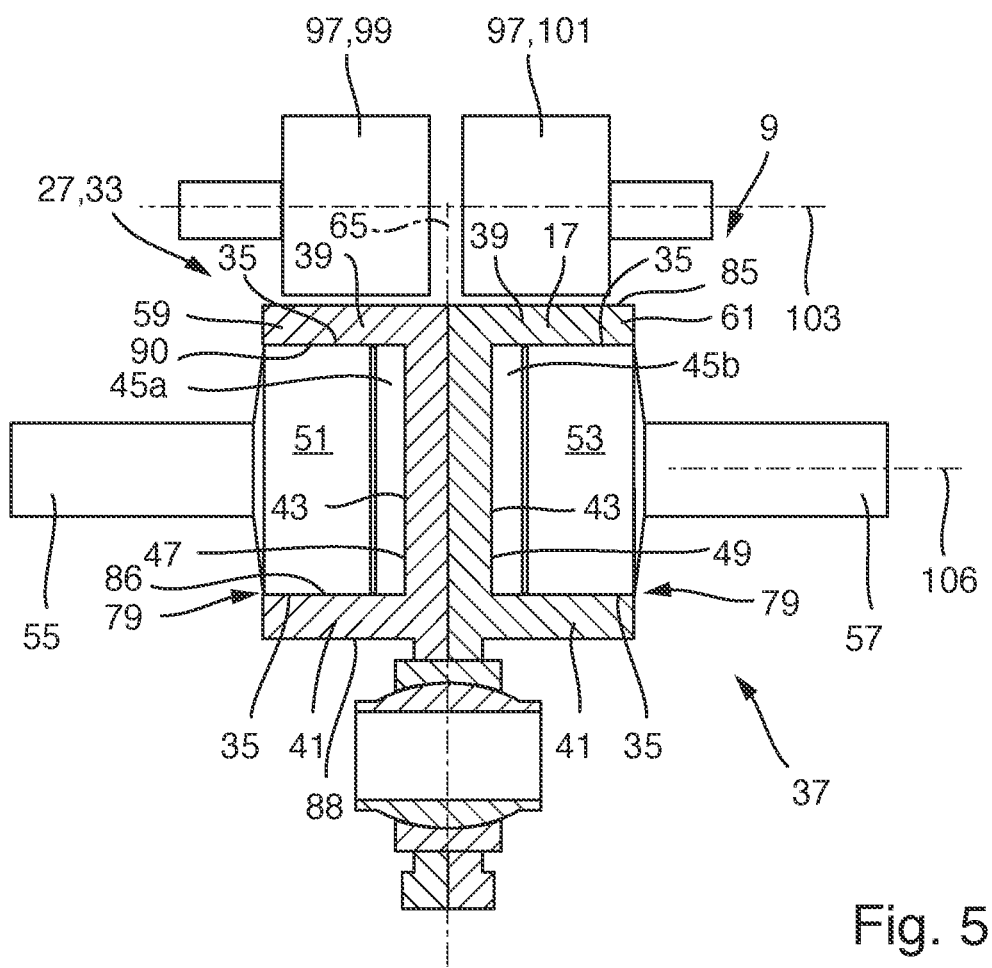
FIG. 5 is a cross sectional view across the track longitudinal axis of the connection assembly shown in FIG. 2.

The roller bearing 27 comprises a guide rail 29 fixedly mounted to the main wing 5 and a first roller unit 31 fixedly mounted to the rear end 23 of the slat track 17 and engaging the guide rail 29. The roller bearing 27 comprises a second roller unit 33 that is fixedly mounted to the main wing 5 and that engages an engagement surface 35 provided at the intermediate portion 25 of the slat track 17. As shown in FIGS. 3-5, the slat track 17 has a double-C-shaped profile 37 comprising an upper flange portion 39, a lower flange portion 41 and at least one web portion 43 connecting upper and lower flange portions 39, 41. The second roller unit 33 is arranged in a recess 45 between upper and lower flange portions 39, 41 and engages the engagement surface 35 provided at the upper flange portion 39 and at the lower flange portion 41.

As shown in FIGS. 4 and 5, the double-C-shaped profile 37 of the slat track 17 provides that a first recess 45a is formed between the upper and lower flange portions 39, 41 at a first side 47 of the web portion 43, and a second recess 45b is formed between the upper and lower flange portions 39, 41 at a second side 49 of the web portion 43 opposite the first side 47. The second roller unit 33 comprises a first roller element 51 and a second roller element 53.

The first roller element 51 is arranged in the first recess 45a and the second roller element 53 is arranged in the second recess 45b. First and second roller elements 51, 53 are arranged coaxially and have the same radius. The first roller element 51 is mounted on a first shaft 55 and the second roller element 53 is mounted on a second shaft 57 separate from the first shaft 55. First and second shafts 55, 57 are independently supported at the main wing 5.

FIGS. 3-5 show that the slat track 17 comprises a first track part 59 and a second track part 61 that are formed separate from one another. Each of the first and second track parts 59, 61 is formed integrally and extends along the track longitudinal axis 19 from the rear end 23 to the front end 21. The first and second track parts 59, 61 are mounted to one another by bolts 63 and rest against one another along a contact plane 65 spanned by the track longitudinal axis 19 and a wing thickness direction 67.

As visible in FIG. 3, the first roller unit 31 comprises a third roller element 69 and a fourth roller element 71. Third and fourth roller elements 69, 71 are arranged coaxially and have the same radius. The third roller element 69 is mounted to the first track part 59 and the fourth roller element 71 is mounted to the second track part 61. Alternatively, the first roller unit 31 might also comprise only a single third roller element 69.

As shown in FIGS. 2 to 5, the roller bearing 27 comprises a biasing roller unit 97. The biasing roller unit 97 biases the first roller unit 31 in contact with the guide rail 29 to avoid play between the first roller unit 31 and the guide rail 29, and biases the second roller unit 33 in contact with the engagement surface 35 to avoid play between the second roller unit 33 and the engagement surface 35.

In the embodiment shown in FIGS. 1 to 5, the biasing roller unit 97 comprises a first biasing roller element 99 and a second biasing roller element 101 arranged adjacently in a coaxial manner, so that they rotate about a single biasing axis 103 parallel to the first and second axes of rotation 104, 106 of the first and second roller units 31, 33. The first biasing roller element 99 contacts the first track part 59 while the second biasing roller element 101 contacts the second track part 61.

Figure 6:
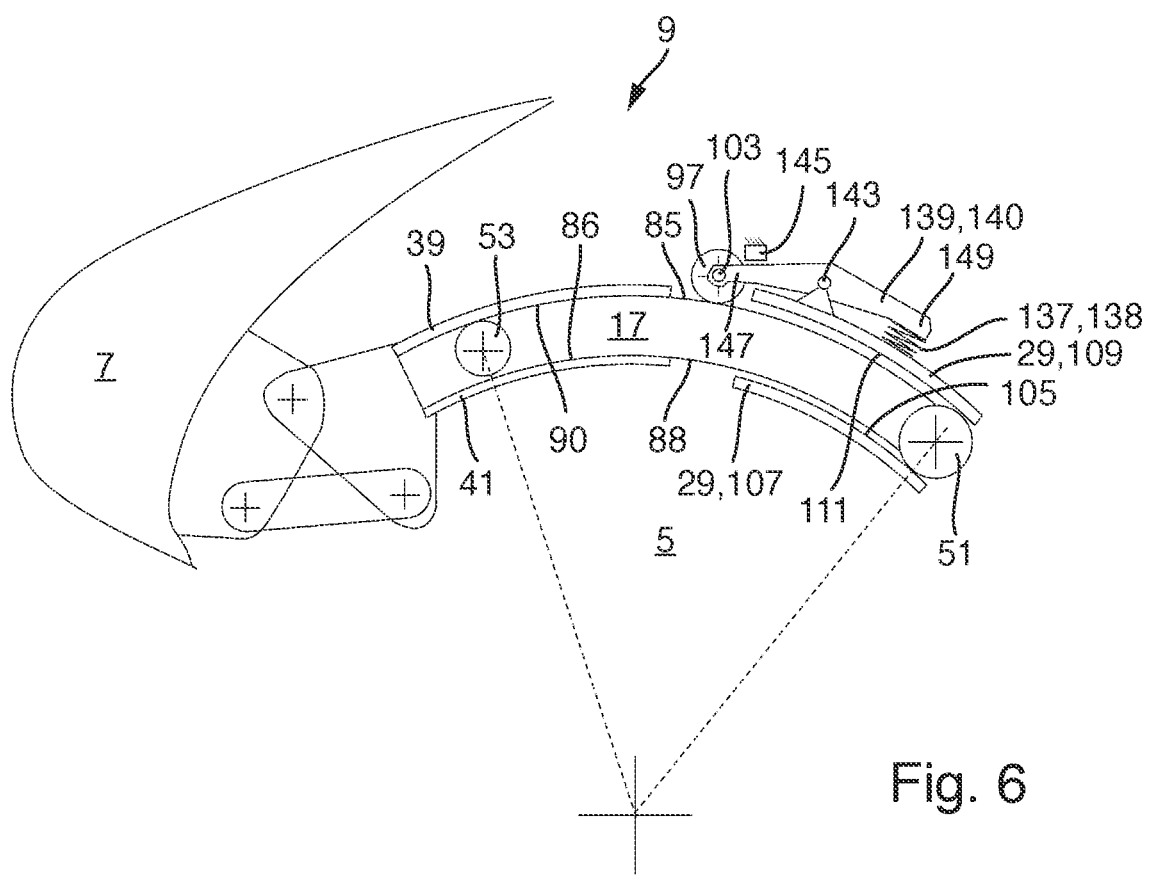
FIG. 6 is a side view of a connection assembly according to a second embodiment of the invention.

In the embodiment shown in FIGS. 2 to 5 as well as in the embodiment shown in FIG. 6, the biasing roller unit 97 is mounted to the main wing 5 using a biasing element 137 biasing the biasing roller unit 97 in engagement with a surface of the slat track 17 at the intermediate portion 25, to bias the first roller unit 31 in contact with the guide rail 29 and the second roller unit 33 in contact with the engagement surface 35.

Specifically, the biasing roller unit 97 is biased in engagement with an upper surface 85 of the upper flange portion 39 of the slat track 17, in such a way that the biasing roller unit 97 biases the first roller unit 31 in contact with an upper rail surface 105 of a lower rail part 107 of the guide rail 29, and in such a way that the biasing roller unit 97 biases the second roller unit 33 in contact with the engagement surface 35 provided at a lower surface 90 of the upper flange portion 39. Further, the guide rail 29 is formed in a way of a slot including the lower rail part 107 with the upper rail surface 105 and an upper rail part 109 with a lower rail surface 111 opposite from the upper rail surface 105.

The embodiment shown in FIG. 6 differs from the embodiment shown in FIGS. 2 to 5 by the biasing roller unit 97 being mounted to a pivot element 139 rotatably about the biasing axis 103. The pivot element 139 is mounted to the main wing 5 pivotably about a pivot axis 143 spaced apart from and in parallel to the biasing axis 103. The biasing element 137 biases the pivot element 139 about the pivot axis 143, so that the biasing roller unit 97 mounted to the pivot element 139 is biased in engagement with the slat track 17.

A backstop element 145 is provided for limiting deflection of the pivot element 139 about the pivot axis 143. In the embodiment shown in FIG. 6, the pivot element 139 is formed as a rocker element 140 holding the biasing roller unit 97 at a first end 147 and connected to the biasing element 137 at the opposite second end 149. The biasing element 137 is formed as a linear spring element 138 that is supported at the guide rail 29. Between the biasing roller unit 97 and the biasing element 137 the pivot element 139 is pivotably mounted to the main wing 5 via the guide rail 29, so that the biasing element 137 biases the second end 149 of the pivot element 139 away from the slat track 17 and thus biases the pivot element 139 to pivot about the pivot axis 143 thereby biasing the first end 147 with the biasing roller unit 97 into engagement with the slat track 17.

Figure 7:
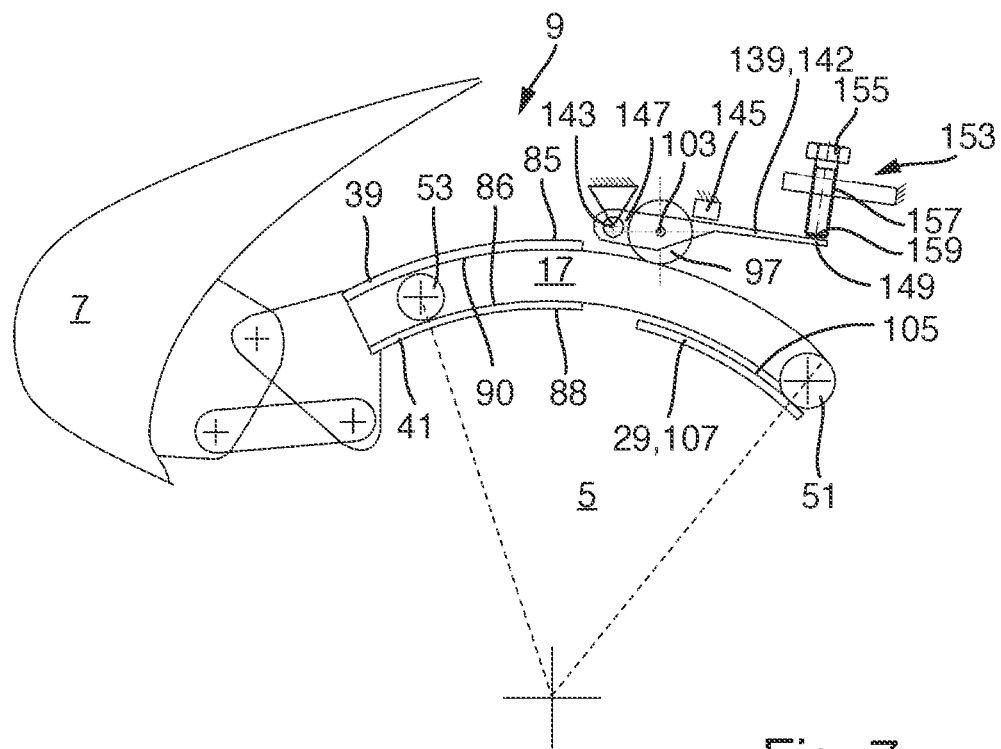
FIG. 7 is a side view of a connection assembly according to a third embodiment of the invention.
Figure 8:
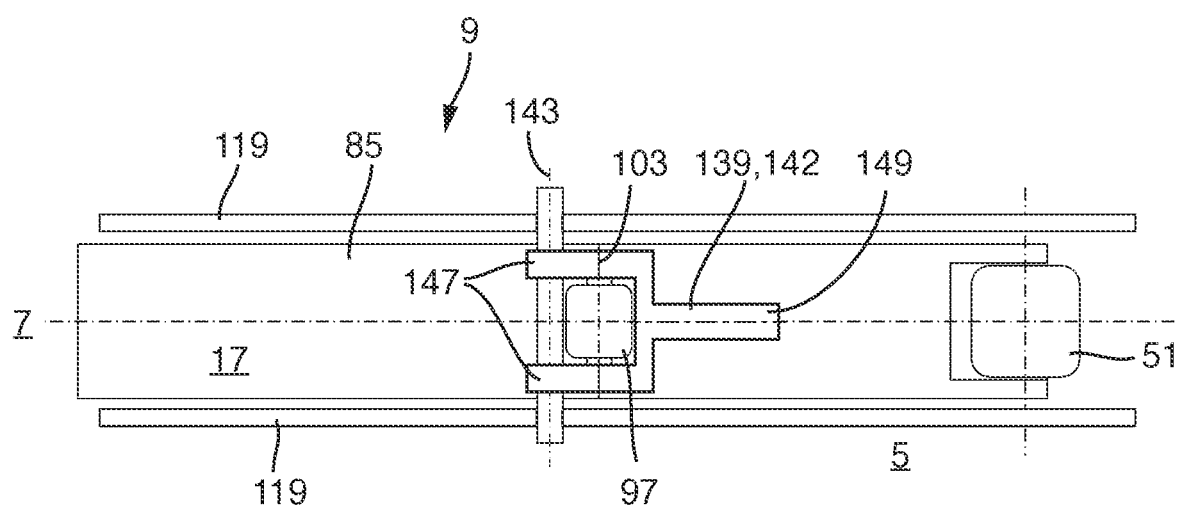
FIG. 8 is a top view of the connection assembly shown in FIG. 7.

The embodiment shown in FIGS. 7 and 8 differ from the embodiment shown in FIG. 6 by the pivot element 139 being formed as an elastic lever 142 mounted directly to the main wing 5 pivotably about the pivot axis 143 at a first end 147 and supported directly at the main wing 5 at an opposite second end 149. Between the first and second ends 147, 149 the biasing roller unit 97 is mounted to the pivot element 139. In this embodiment, the biasing element 137 is formed as the pivot element 139 itself, meaning that at least the longer part of the pivot element 139 between the pivot axis 143 and the second end 149 is formed of an elastic material, so that the pivot element 139 is formed with a predetermined elasticity.

The second end 149 of the pivot element 139 is adjustably supported at the main wing 5 by an adjustment device 153 configured for adjusting the distance of the second end 149 of the pivot element 139 from the slat track 17 to adjust the biasing force of the biasing roller unit 97 onto the slat track 17. In the embodiment shown in FIGS. 7 and 8, the adjustment device 153 includes a screw 155 that is arranged in a threaded bore 157 at the main wing 5 and contacts with its tip 159 the second end 149 of the pivot element 139, so that by rotating the screw 155 in the bore 157 the axial position of the tip 159 of the screw 155 can be adjusted thereby increasing or decreasing pressure of the tip 159 on the second end 149 of the pivot element 139. This embodiment allows the guide rail 29 being formed in a one-sided way including only the lower rail part 107 with the upper rail surface 105, but not including any upper rail part with a lower rail surface opposite from the upper rail surface.

Figure 9:
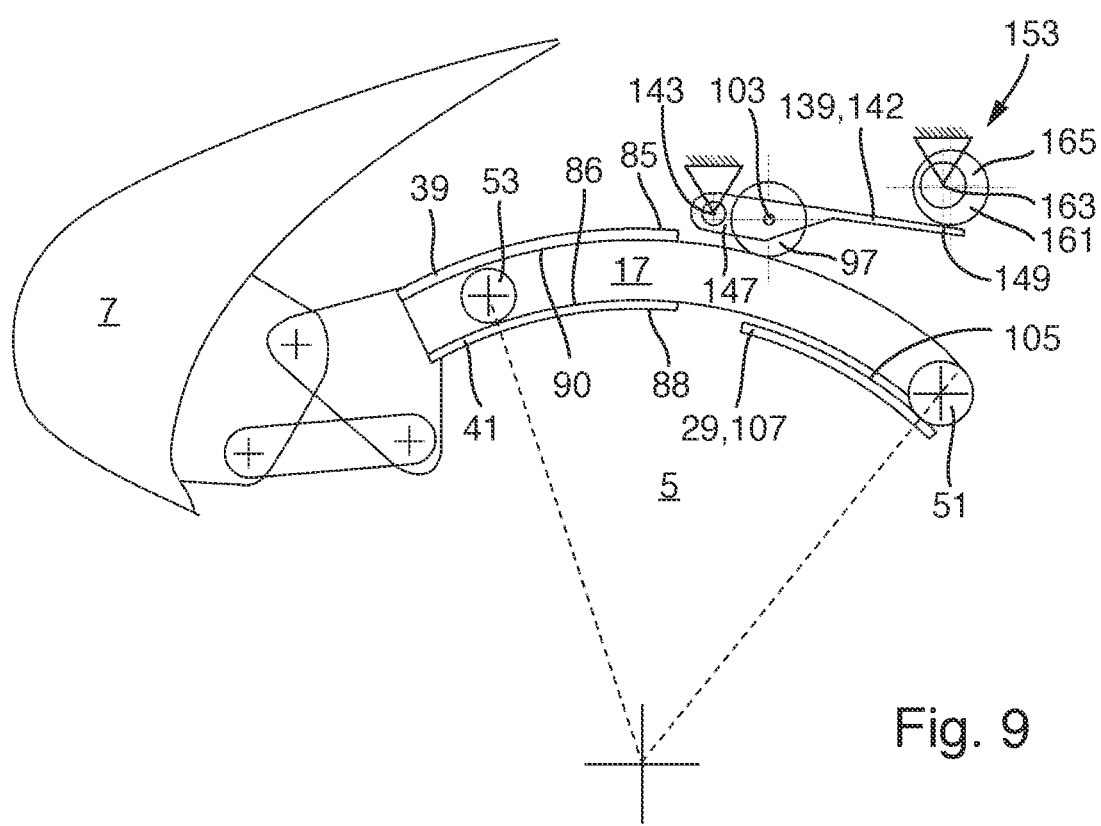
FIG. 9 is a side view of a connection assembly according to a fourth embodiment of the invention.
Figure 10:
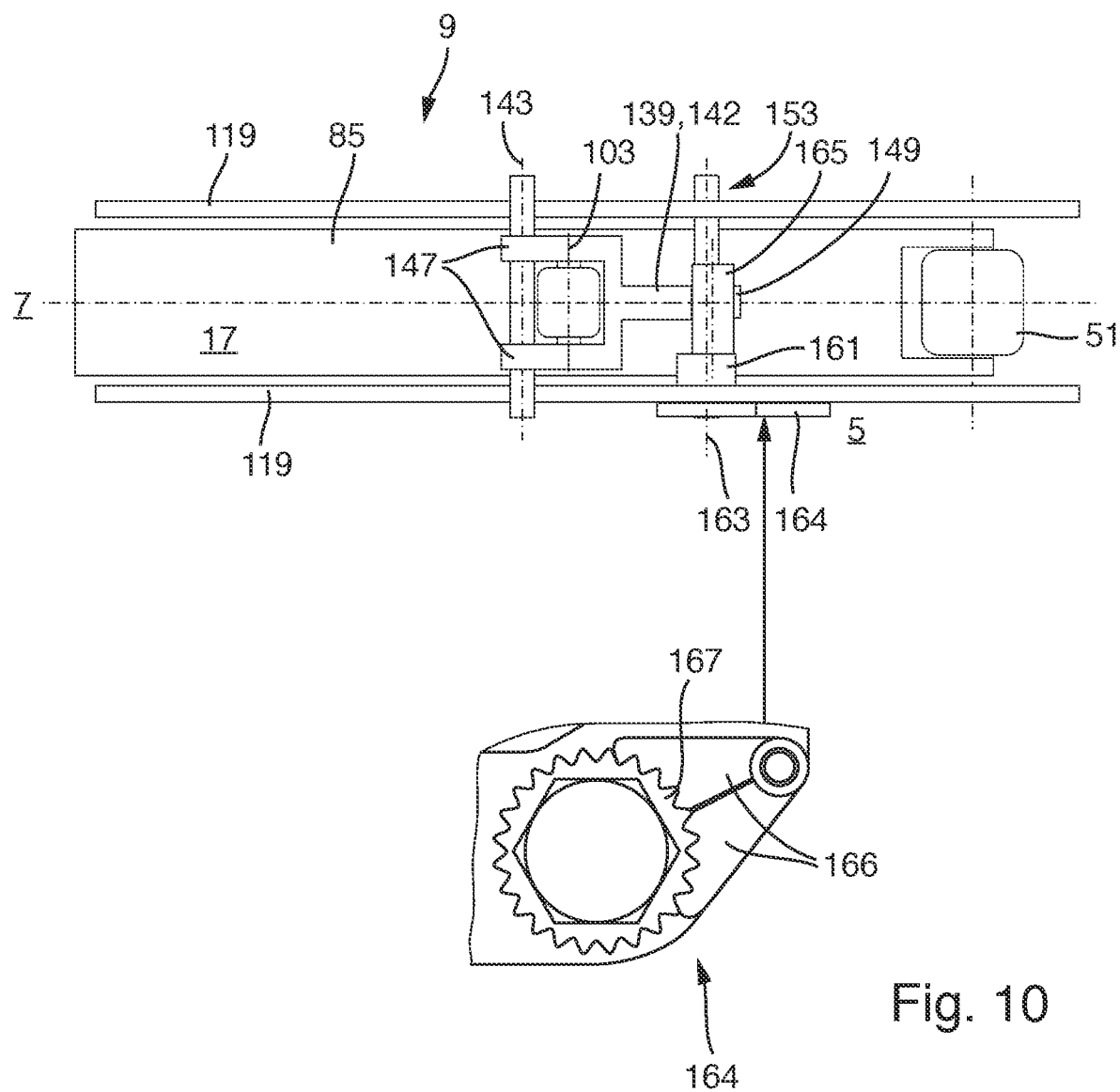
FIG. 10 is a top view of the connection assembly shown in FIG. 9.

The embodiment shown in FIGS. 9 and 10 differ from the embodiment shown in FIGS. 7 and 8 by the adjustment device 153 instead of a screw 155 including an eccentric shaft 161 mounted to the main wing 5 rotatably about an adjustment axis 163 and having an eccentric portion 165 which is eccentric to the adjustment axis 163 and which is in contact with the second end 149 of the pivot element 139, so that by rotation of the eccentric shaft 161 about the adjustment axis 163 the eccentric portion 165 rotates with its varying radius and increases or decreases pressure of the eccentric portion 165 on the second end 149 of the pivot element 139.

As shown in FIG. 10, the adjustment device 153 further includes a locking member 164 for locking the eccentric shaft 161 in a fixed angular position relative to a leading edge rib 119 of the main wing 5, thereby locking the eccentric portion 165 in a fixed position relative to the second end 149 of the pivot element 139. The locking member 164 comprises a toothed lock bar 166 engaging a toothed outer surface 167 of the eccentric shaft 161.

Figure 11:
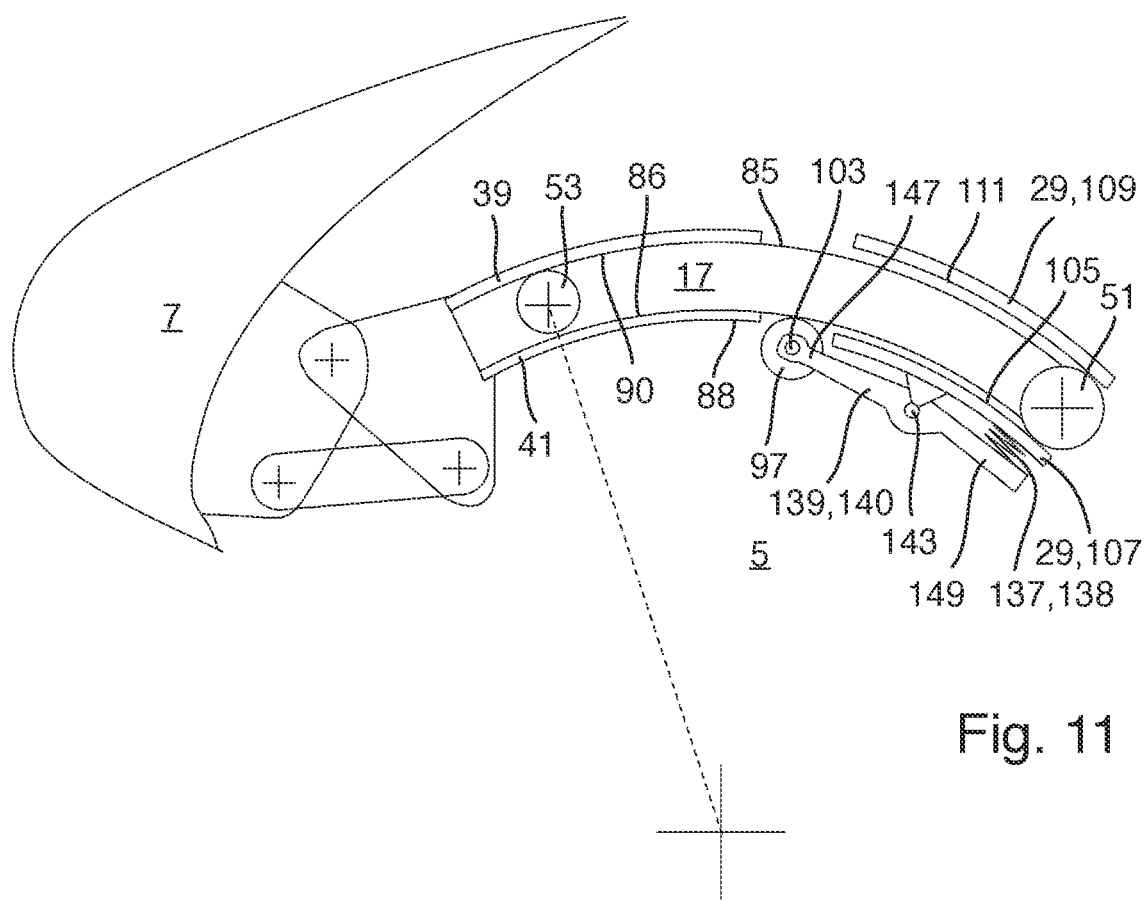
FIG. 11 is a side view of a connection assembly according to a fifth embodiment of the invention; and, FIG. 12 is a side view of a connection assembly according to a sixth embodiment of the invention.

The embodiment shown in FIG. 11 differs from the embodiment shown in FIG. 6 by the biasing roller unit 97 being mounted to the main wing 5 via the lower rail part 107 to engage a lower surface 88 of the lower flange portion 41 of the slat track 17, in such a way that the biasing roller unit 97 biases the first roller unit 31 in contact with a lower rail surface 111 of an upper rail part 109 of the guide rail 29, and in such a way that the biasing roller unit 97 biases the second roller unit 33 in contact with the engagement surface 35 provided at an upper surface 86 of the lower flange portion 41.

Figure 12:
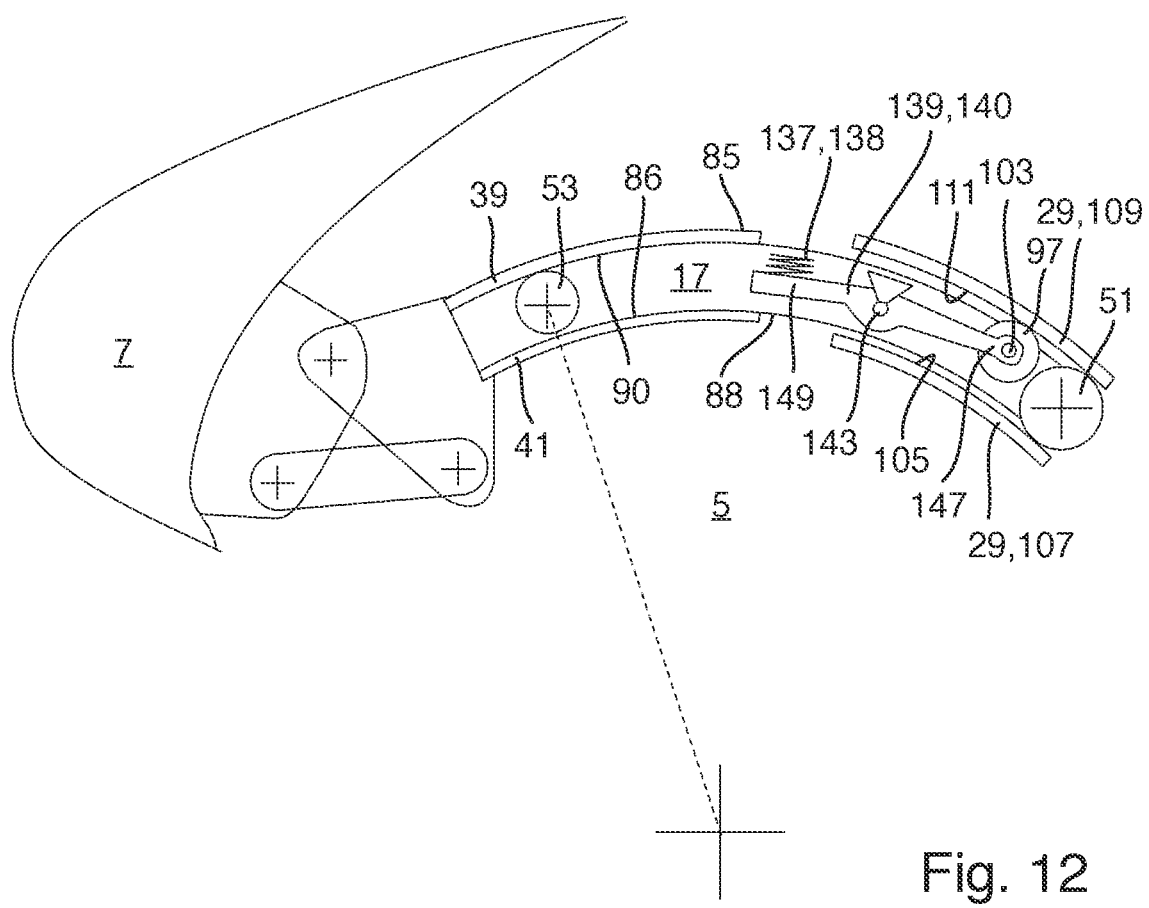

The embodiment shown in FIG. 12 differs from the embodiment shown in FIG. 6 by the biasing roller unit 97 being mounted to the slat track 17 to engage the engagement surface 35 provided at a lower surface 90 of the upper flange portion 39 in such a way that the biasing roller unit 97 biases the second roller unit 33 in contact with the engagement surface 35 provided at an upper surface 86 of the lower flange portion 41.

As shown in FIG. 1, the connection assembly 9 is a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91.

The described embodiments of the present invention enable efficient play reduction during deployment of the slat 7. By such a play reduction, precision of the slat setting positions, i.e. the retracted position ii and the at least one extended position 13, 15, is increased. Further, the play reduction reduced wear on the slat track 17, on the guide rail 29, and on the first and second roller units 31, 33. Also, undesired vibration is avoided. By the biasing roller unit 97 being biased and thus urging in an elastic manner the first roller unit 31 in contact with the guide rail 29 and/or the second roller unit 33 in contact with the engagement surface 35, it is provided that load peaks and high static loads are received mainly by the first and/or second roller units 31, 33, while the biasing roller unit 97 merely serves for creating contact and reducing play during deployment of the slat 7, but not for receiving essential aerodynamic loads during flight.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:
a main wing,
a slat, and
a connection assembly movable connecting the slat to the main wing, wherein the slat is movable between a retracted position and at least one extended position,
wherein the connection assembly comprises an elongate slat track that extends along a track longitudinal axis between a front end and a rear end and has an intermediate portion between the front and rear ends,
wherein the front end of the slat track is mounted to the slat,
wherein the rear end and the intermediate portion of the slat track are mounted to the main wing by a roller bearing such that the slat track is movable along the track longitudinal axis,
wherein the roller bearing comprises a guide rail mounted to the main wing and a first roller unit mounted to the rear end of the slat track and engaging the guide rail,
wherein the roller bearing comprises a second roller unit that is mounted to the main wing and that engages an engagement surface provided at the intermediate portion of the slat track,
wherein the roller bearing comprises a biasing roller unit biasing the first roller unit in contact with the guide rail and/or biasing the second roller unit in contact with the engagement surface, and
wherein the biasing roller unit is mounted to a pivot element rotatably about a biasing axis.

2. The wing according to claim 1, wherein the slat track has a profile comprising an upper flange portion, a lower flange portion and at least one web portion connecting upper and lower flange portions, and
the second roller unit is arranged in a recess between upper and lower flange portions and engages the engagement surface provided at the upper flange portion and/or at the lower flange portion.

3. The wing according to claim 2, wherein the slat track has such a profile that a first recess is formed between the upper and lower flange portions at a first side of the web portion, and a second recess is formed between the upper and lower flange portions at a second side of the web portion opposite the first side,
wherein the second roller unit comprises a first roller element and a second roller element,
wherein the first roller element is arranged in the first recess and the second roller element is arranged in the second recess, and
wherein first and second roller elements are arranged coaxially and have the same radius.

4. The wing according to claim 1, wherein the biasing roller unit is mounted to the main wing using a biasing element biasing the biasing roller unit in engagement with the slat track, and/or
wherein the biasing roller unit is mounted to the slat track using a biasing element biasing the biasing roller unit in engagement with the guide rail.

5. The wing according to claim 4, wherein the biasing roller unit is mounted to the main wing in such a way that it is biased in engagement with the slat track, to bias the first roller unit in contact with the guide rail and/or the second roller unit in contact with the engagement surface.

6. The wing according to claim 5, wherein the biasing roller unit is biased in engagement with an upper surface of the slat track in such a way that the biasing roller unit biases the first roller unit in contact with an upper rail surface of a lower rail part of the guide rail, and/or the second roller unit in contact with the engagement surface provided at the upper flange portion.

7. The wing according to claim 5, wherein the biasing roller unit is directly mounted to the main wing or is mounted to the main wing via the guide rail.

8. The wing according to claim 5,
wherein the pivot element is mounted to the main wing pivotably about a pivot axis spaced apart from the biasing axis, and
wherein the biasing element biases the pivot element about the pivot axis.

9. A wing for an aircraft, comprising:
a main wing,
a slat,
a connection assembly movable connecting the slat to the main wing, wherein the slat is movable between a retracted position and at least one extended position,
wherein the connection assembly comprises an elongate slat track that extends along a track longitudinal axis between a front end and rear end and has an intermediate portion between the front and rear ends,
wherein the front end of the slat track is mounted to the slat,
wherein the rear end and the intermediate portion of the slat track are mounted to the main wing by a roller bearing such that the slat track is movable along the track longitudinal axis,
wherein the roller bearing comprises a guide rail mounted to the main wing and a first roller unit mounted to the rear end of the slat track and engaging the guide rail,
wherein the roller bearing comprises a second roller unit that is mounted to the main wing and the engages an engagement surface provided at the intermediate portion of the slat track, wherein the roller bearing comprises a biasing roller unit biasing the first roller unit in contract with the guide rail and/or biasing the second roller unit in contact with the engagement surface, wherein the biasing roller unit is mounted to a pivot element rotably about a biasing axis, wherein a backstop element is provided for limiting deflection of the pivot element.

10. A wing for an aircraft, comprising:
a main wing,
a slat,
a connection assembly movable connecting the slat to the main wing, wherein the slat is movable between a retracted position and at least one extended position,
wherein the connection assembly comprises an elongate slat track that extends along a track longitudinal axis between a front end and rear end and has an intermediate portion between the front and rear ends,
wherein the front end of the slat track is mounted to the slat,
wherein the rear end and the intermediate portion of the slat track are mounted to the main wing by a roller bearing such that the slat track is movable along the track longitudinal axis,
wherein the roller bearing comprises a guide rail mounted to the main wing and a first roller unit mounted to the rear end of the slat track and engaging the guide rail, wherein the roller bearing comprises a second roller unit that is mounted to the main wing and the engages an engagement surface provided at the intermediate portion of the slat track, wherein the roller bearing comprises a biasing roller unit biasing the first roller unit in contract with the guide rail and/or biasing the second roller unit in contact with the engagement surface, wherein the biasing roller unit is mounted to the main wing using a biasing element biasing the biasing roller unit in engagement with the slat track, and wherein the biasing roller unit is mounted to a pivot element rotatably about a biasing axis, wherein the pivot element is formed as a rocker element holding the biasing roller unit at a first end and connected to the biasing element at the opposite second end, wherein between the biasing roller unit and the biasing element the pivot element is pivotably mounted to the main wing.

11. The wing according to claim 10, wherein the biasing element is formed as a spring element.

12. The wing according to claim 8, wherein the pivot element is formed as an elastic lever pivotably mounted to the main wing at a first end and supported at the main wing at an opposite second end, wherein between the first and second ends the biasing roller unit is mounted to the pivot element, and wherein the biasing element is formed as the pivot element itself so that at least a part of the pivot element is formed of an elastic material.

13. The wing according to claim 12, wherein the second end of the pivot element is adjustably supported at the main wing by an adjustment device configured for adjusting the position of the second end of the pivot element relative to the slat track to adjust the biasing force of the biasing roller unit onto the slat track.

14. An aircraft comprising a wing according to claim 1.

15. A connection assembly for a wing according to claim 1, for movably connecting a slat to a main wing for an aircraft, the connection assembly comprising an elongate slat track that extends along a track longitudinal axis between a front end and a rear end and has an intermediate portion between the front and rear ends, wherein the front end of the slat track is configured to be mounted to the slat, wherein the rear end and the intermediate portion of the slat track are configured to be mounted to the main wing by a roller bearing such that the slat track is movable along the track longitudinal axis, wherein the roller bearing comprises a guide rail configured to be mounted to the main wing, and a first roller unit mounted to the rear end of the slat track and configured for engaging the guide rail, and wherein the roller bearing comprises a second roller unit that is configured to be mounted to the main wing and that is configured for engaging an engagement surface provided at the intermediate portion of the slat track, wherein the roller bearing comprises a biasing roller unit configured for biasing the first roller unit in contact with the guide rail and/or configured for biasing the second roller unit in contact with the engagement surface.

* * * * *